United States Patent [19]

Kitagawa et al.

[11] Patent Number: 4,997,202
[45] Date of Patent: * Mar. 5, 1991

[54] SUSPENSION SYSTEM

[75] Inventors: Masashi Kitagawa, Asaka; Hajime Kajiwara, Fujimi; Shoichi Sano, Tokyo, all of Japan

[73] Assignee: Honda Giken Kogyo Kabushiki Kaisha, Tokyo, Japan

[*] Notice: The portion of the term of this patent subsequent to Aug. 22, 2006 has been disclaimed.

[21] Appl. No.: 338,116

[22] Filed: Apr. 14, 1989

[30] Foreign Application Priority Data

Apr. 15, 1988 [JP] Japan .................. 63-94074

[51] Int. Cl.$^5$ .............................. B60G 11/08
[52] U.S. Cl. .................. 280/719; 280/669; 280/694; 267/31; 267/48; 364/424.05; 364/562
[58] Field of Search ........... 280/669, 672, 690, 694, 280/697, 698, 699, 702, 711, 712, 718, 719, 720, 707; 267/31, 48, 47; 364/424.05, 562, 567

[56] References Cited

U.S. PATENT DOCUMENTS

| 2,004,063 | 6/1935 | Ganz | 280/699 |
| 3,140,083 | 7/1964 | Mahrle | 267/15 |
| 3,169,026 | 2/1965 | Soer | 280/718 |
| 3,204,717 | 9/1965 | Collins | 280/663 |
| 3,499,662 | 3/1970 | Mahrle | 280/124 |
| 4,411,159 | 10/1983 | Spear et al. | 267/47 |
| 4,619,467 | 10/1986 | Lafferty | 280/708 |
| 4,858,950 | 8/1989 | Kajiwara et al. | 280/669 |

FOREIGN PATENT DOCUMENTS

| 265682 | 5/1988 | European Pat. Off. |  |
| 318753 | 6/1989 | European Pat. Off. | 280/719 |
| 2541841 | 3/1977 | Fed. Rep. of Germany . |  |
| 2722015 | 11/1978 | Fed. Rep. of Germany . |  |
| 2927486 | 1/1981 | Fed. Rep. of Germany | 280/719 |
| 3004158 | 8/1981 | Fed. Rep. of Germany . |  |
| 664698 | 9/1929 | France . |  |
| 1483928 | 6/1967 | France . |  |
| 60-106807 | 7/1985 | Japan . |  |
| 60-155610 | 10/1985 | Japan . |  |

Primary Examiner—Charles A. Marmor
Assistant Examiner—Tamara L. Finlay
Attorney, Agent, or Firm—Irving M. Weiner; Joseph P. Carrier; Pamela S. Burt

[57] ABSTRACT

A suspension system in a motor vehicle has a suspension including at least a resilient member extending transversely of the motor vehicle and having one end operatively coupled to a knuckle, the resilient member supporting a vehicle body of the motor vehicle, and a detector disposed on the resilient member for detecting at least one of a change in a load and a change in the height of the motor vehicle from the ground due to an external force applied to the suspension. The resilient member comprises at least a leaf spring, and the detector is attached to the leaf spring for detecting a strain of the leaf spring due to flexing thereof. A calculator is provided for calculating at least one of a vertical load applied to a road wheel coupled to the knuckle and a displacement of the road wheel with respect to the vehicle body based on a change in the strain detected by the detector.

12 Claims, 4 Drawing Sheets

SUSPENSION SYSTEM

BACKGROUND OF THE INVENTION

1. Field of the Invention

The present invention relates to a suspension system having means for easily determining a change in the condition of a suspension which is caused by an external force applied to the suspension.

2. Description of the Relevant Art

There has been proposed a vehicular suspension system including a shock absorber having a coil spring with a lower end coupled to a knuckle by which a road wheel is rotatably supported and an upper end coupled to a vehicle body through a resilient member with an electrically conductive rubber layer mounted thereon as a strain detector (see Japanese Laid-Open Utility Model Publication No. 60-106807). While a motor vehicle equipped with such a suspension system is traveling, loads acting on the shock absorber and the resilient member are varied by irregularities on the road surface and swinging movement of the vehicle body, thus expanding and contracting the resilient member and the electrically conductive rubber member. Therefore, the road surface irregularities and the swinging movement of the vehicle body can be detected as changes in electric resistance which are brought about by the expansion and contraction of the rubber member.

Japanese Laid-Open Utility Model Publication No. 60-155610 discloses another vehicular suspension system including a shock absorber having a coil spring with a lower end coupled to a knuckle by which a road wheel is rotatably supported and an upper end coupled to a vehicle body through a resilient member. The upper end of the shock absorber and a load detector are fastened together to the vehicle body. The load detector comprises a piezoelectric element for producing an output signal indicative of a change in a load on the shock absorber.

Determination of a change in the condition of the suspension based on the detected value in the suspension assembly for controlling the attitude of the suspension lacks a desired degree of accuracy. Since the suspension system itself cannot detect a change in the height of the vehicle body from the ground as a change in the condition of the suspension which is induced by an external force applied, a separate vehicle height sensor is required. Because the known load detectors are mounted on the upper end of the shock absorber where a large load is concentrated, the suspension system is complex in structure, expensive to manufacture, and has a durability problem.

SUMMARY OF THE INVENTION

In view of the aforesaid shortcomings of the conventional suspension systems, it is an object of the present invention to provide a suspension system which is lightweight and of good space utility efficiency. More particularly, it is an object of the present invention to provide such a system having a suspension component interconnecting a road wheel and a vehicle body and including a resilient member or an elongate resiliency member extending transversely of the vehicle body, and also having at least one simple strain detector mounted on the resilient member for detecting a strain produced in the resilient member in response to an external force applied thereto, so that changes in the condition of a suspension which are caused by the applied external force, i.e., loads applied to the road wheel in three directions, or vertical, longitudinal, and transverse directions with respect to the vehicle body, and an amount of displacement of the road wheel with respect to the vehicle body, can easily be determined.

According to the present invention, a suspension system in a motor vehicle has a suspension including at least a resilient member extending transversely of the motor vehicle and having one end coupled to a knuckle, the resilient member supporting a vehicle body of the motor vehicle, and detector means disposed on the resilient member for detecting at least one of a change in a load and a change in the height of the motor vehicle from the ground due to an external force applied to the suspension. The resilient member comprises at least a leaf spring, and the detector means is attached to the leaf spring for detecting a strain of the leaf spring due to flexing thereof. The suspension system also includes arithmetic means for calculating at least one of a vertical load applied to a road wheel coupled to the knuckle and a displacement of the road wheel with respect to the vehicle body based on a change in the strain detected by the detector means.

The resilient member may comprise an elongate resilient member extending between knuckles supporting two laterally spaced road wheels, respectively, of the motor vehicle, and having opposite ends coupled respectively to the knuckles related the suspension may further include holder means coupled to the vehicle body and holding the elongate resilient member at two holding points which are swingable and slidable in the longitudinal direction of the elongate resilient member with respect to the vehicle body for bearing the load of the vehicle body.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
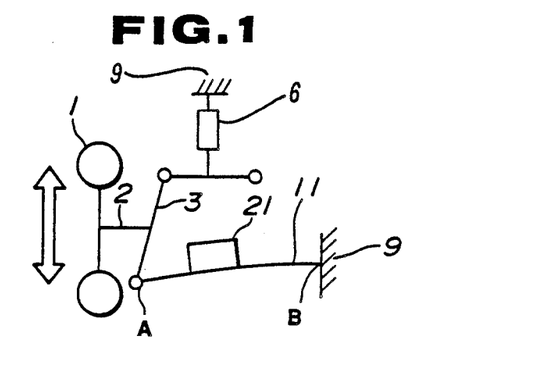
FIG. 1 is a schematic front elevational view of a suspension system according to a first embodiment of the present invention for use with one road wheel, with a leaf spring employed as a lower arm.

FIG. 1 schematically shows a suspension system according to a first embodiment of the present invention, for use with one road wheel only. The suspension system shown in FIG. 1 is in the form of a double-wishbone suspension system comprising a road wheel 1, an axle 2, a knuckle 3, an upper arm 4, and a lower arm 11 comprising a leaf spring serving as an elongate resilient member and having resiliency in vertical directions and extending transversely of a motor vehicle. The leaf spring 11 has an outer end coupled at a supporting point A to a lower portion of the knuckle 3 and an inner end fixedly supporting a vehicle body 9 at a supporting point B. A damper 6 comprising a shock absorber only is combined with the suspension system and is, for example, connected between the upper arm 4 and the vehicle body 9.

Since the lower arm comprises the leaf spring 11, the knuckle 3 that is coupled to the outer end of the leaf spring 11 at the supporting point A is normally urged downwardly under the resiliency of the leaf spring 11 with its inner end fixed to the vehicle body 9 at the supporting point B. With the leaf spring 11 doubling as the lower arm, therefore, the suspension system is reduced in weight and the damper in the form of a shock absorber only with no coil spring can be employed.

According to the present invention, a single strain detector 21, for example, is mounted on an intermediate portion of the leaf spring 11. The strain detector 21 comprises a simple strain gage or the like for detecting a strain of the leaf spring 11 which is caused upon flexing thereof by an external force applied to the leaf spring 11.

A detected signal from the strain detector 21 is applied to a vehicle-mounted computer (not shown) which calculates changes in the condition of the suspension caused by the external force applied thereto, through arithmetic operations or based on a data map. Specifically, loads applied to the road wheel in three directions, i.e., vertical, longitudinal, and transverse directions of the motor vehicle, and changes in the loads are determined from changes in the strain of the leaf spring 11. Moreover, a vertical displacement of the center of the road wheel (i.e., the axle 2) with respect to the vehicle body 9, for example, is determined to calculate the height of the vehicle body 9 from the ground.

A specific process of calculating the above values will be described later on with reference to FIGS. 5 through 9.

Figure 2:
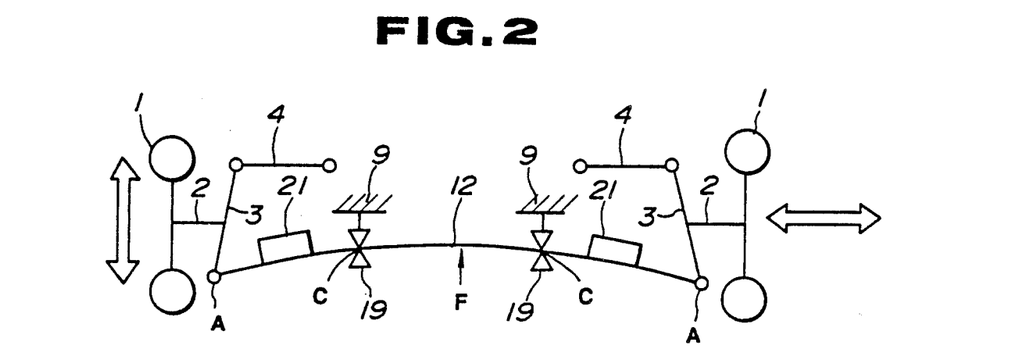
FIG. 2 is a schematic front elevational view of a suspension system according to a second embodiment of the present invention for use with two road wheels with a leaf spring which extends between the road wheels being used as lower arms.

FIG. 2 shows a suspension system according to a second embodiment of the present invention in which an elongate leaf spring 12 extends transversely of a motor vehicle between suspensions supporting two laterally spaced road wheels. Knuckles 3 supporting road wheels 1, respectively, have lower portions coupled respectively to the opposite ends of the leaf spring 12 at supporting points A. The leaf spring 12 has an intermediate portion supported by two holder members 19 coupled to a vehicle body 9 at two laterally spaced holding points C of the leaf spring 12 for bearing the weight of the vehicle body 9. The holding points C are held by the holder members 19 so as to be swingable with the leaf spring 12 and slidable therewith in the longitudinal direction of the leaf spring 12 with respect to the vehicle body 9. The leaf spring 12 doubles as lower arms of the suspensions. A suitable load means (not shown) is interposed between the vehicle body 9 and a center, for example, of the intermediate portion of the leaf spring 12 between the holding points C. Dampers (not shown) comprising shock absorbers only are associated respectively with the suspensions.

Since the lower arms of the suspensions are constituted by the opposite end portions of the common leaf spring 12, unlike the first embodiment, knuckles 3 coupled to the opposite ends of the leaf spring 12 at supporting points A are normally urged downwardly under the resiliency of the leaf spring 12. The common leaf spring 12 doubling as the lower arms provides a stabilizer function, allows the load means to be shared by both suspensions, and makes the suspension system lighter in weight. As with the first embodiment, dampers in the form of shock absorbers with no coil springs can be employed.

An upward bending stress is applied as indicated by the arrow F by the load means from below or above the leaf spring 12 to the center of the leaf spring 12 or a certain range thereof between the holding points C. Upon application of such an upward bending stress, the leaf spring 12 is elastically deformed to lift the intermediate portion thereof, thus lowering the wheel supporting points A about the holding points C. Since the knuckles 3 are lowered with respect to the vehicle body 9, the height of the vehicle body from the ground is increased. Conversely, when a downward bending stress is applied to the intermediate portion of the leaf spring 12, the height of the vehicle body above the ground is reduced.

The suspension system shown in FIG. 2 further includes two strain detectors 21, for example, mounted respectively on the leaf spring 12 at laterally spaced portions thereof, i.e., portions between the holding points C and the wheel supporting points A.

Changes in the condition of the suspensions caused by external forces applied thereto are determined from detected signals from the strain detectors 21. Loads imposed on the road wheels 1 in three directions, i.e., vertical, longitudinal, and transverse directions of the motor vehicle, and changes in the loads are determined from changes in the strains of the laterally spaced portions of the leaf spring 12.

Figure 3:
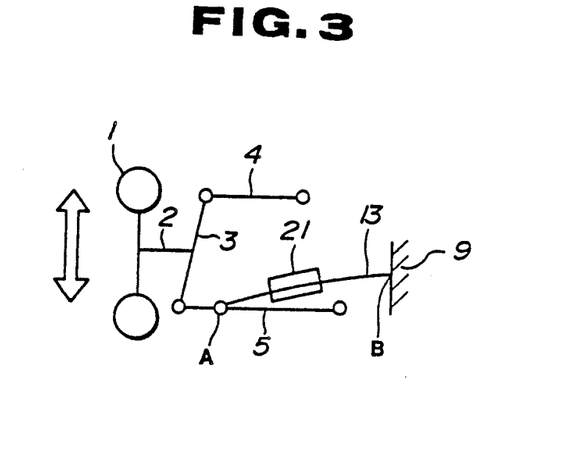
FIG. 3 is a schematic front elevational view of a suspension system according to a third embodiment of the present invention for use with one road wheel, with a leaf spring employed as a portion of a lower arm.

FIG. 3 illustrates a suspension system according to a third embodiment of the present invention. According to the third embodiment, a lower arm 5 is provided separately from a leaf spring 13, and an intermediate portion of the lower arm 5 is coupled to the outer end of the leaf spring 13 at a supporting point A. The lower arm 5 has an outer end coupled to a knuckle 3 supporting a road wheel 1 and an inner end of the leaf spring 13 is fixed to a vehicle body 9 at a supporting point B. The suspension system of FIG. 3 offers substantially the same advantages as those of the first embodiment except that the leaf spring does not double as the lower arm.

A single strain detector 21, for example, is mounted on an intermediate portion of the leaf spring 13 for detecting a strain of the leaf spring 13 to determine loads applied to the road wheel 1 in three directions, i.e., vertical, longitudinal, and transverse directions of the motor vehicle, and changes in the loads.

Figure 4:
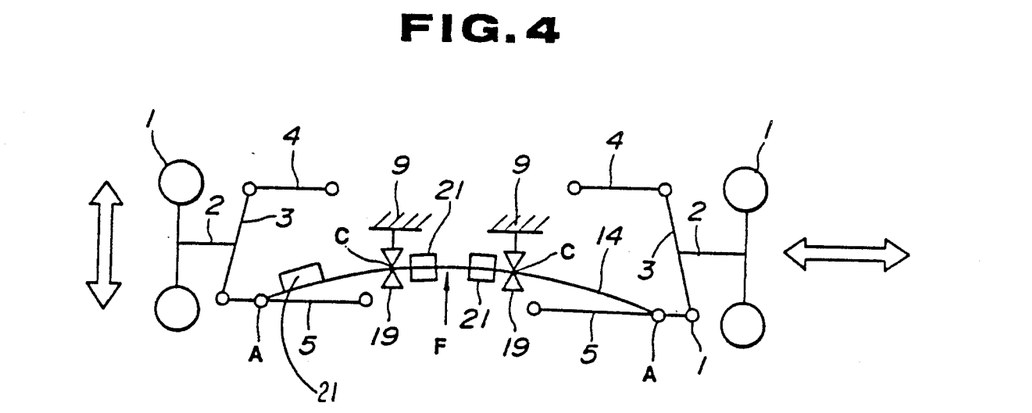
FIG. 4 is a schematic front elevational view of a suspension system according to a fourth embodiment of the present invention for use with two road wheels with a leaf spring which extends between the road wheels being used as portions of lower arms.

According to a fourth embodiment of the present invention shown in FIG. 4, an elongate leaf spring 14 extends transversely of a motor vehicle between suspensions supporting two laterally spaced road wheels. In addition, lower arms 5 are provided separately from the leaf spring 14. The leaf spring 14 has opposite ends coupled to intermediate portions, respectively, of the lower arms 5 at supporting points A. The leaf spring 14 also has an intermediate portion slidably and swingably held at two holding points C by holder members 19 coupled to a vehicle body 9. The suspension system of FIG. 4 offers substantially the same advantages as those of the second embodiment except that the leaf spring does not double as the lower arms.

The suspension system shown in FIG. 4 further includes two strain detectors 21, for example, mounted on the intermediate portion of the leaf spring 14 respectively at laterally spaced locations between the holding points C and a third strain detector connected between a holding point C and a supporting point A.

Changes in the condition of the suspensions caused by external forces applied thereto are determined from detected signals from the strain detectors 21. Loads imposed on the road wheels 1 in three directions, i.e., vertical, longitudinal, and transverse directions of the motor vehicle, and changes in the loads are determined from changes in the strains of the laterally spaced locations of the intermediate portion of the leaf spring 14 as detected by the detectors 21.

The location and number of strain detectors 21 may be selected as desired in view of objectives in designing the suspension system and other factors. The strain detector or detectors may be mounted on the entire surface or a partial surface of, or disposed within, each of the leaf springs 11, 12, 13, 14.

Arithmetic processes which will be carried out based on the detected signals from the strain detectors 21 will be described below.

The following calculations are based on a lateral leaf spring suspension system as shown in FIG. 2 which has a leaf spring employed as part of suspension arms. Various examples of calculations dependent on different types of external forces applied to suspensions will be given below.

EXAMPLE 1

Figure 5:
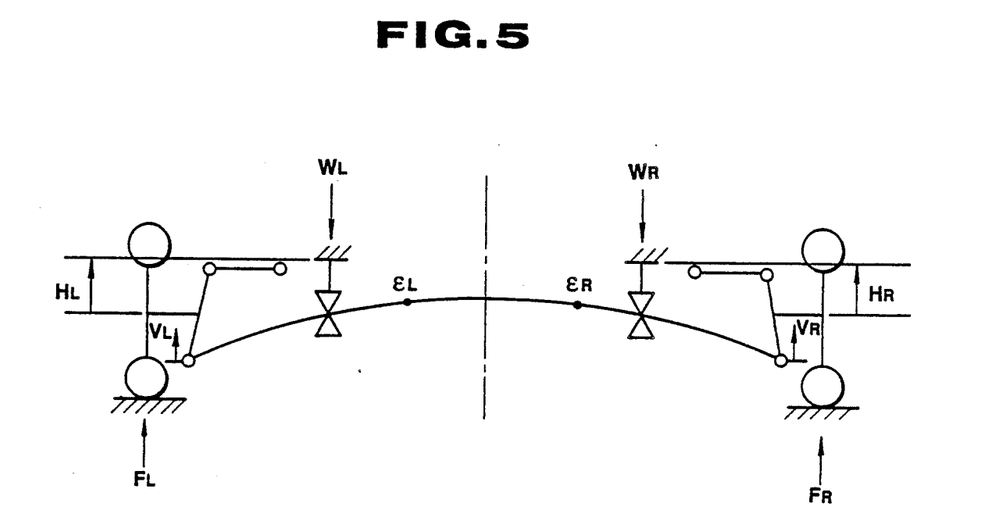
FIG. 5 is a schematic front elevational view of a suspension system, showing the manner in which a change in a suspension is determined when only the weight of a motor vehicle is applied as an external force.

Only the weight of a motor vehicle ($W_L$, $W_R$) is applied to a leaf spring shown in FIG. 5:

The condition of the leaf spring with no passenger and no cargo in the motor vehicle will be used as a reference. Strain detectors are mounted on the leaf spring at two positions, and changes in strain detected thereby are represented respectively by $\epsilon_L$, $\epsilon_R$. Assuming that loads applied to the road wheels (i.e., changes in loads from the loads applied to the road wheels under the reference condition, i.e., no passenger and no cargo in the motor vehicle) are indicated by $F_L$, $F_R$, the loads $F_L$, $F_R$ are calculated as follows:

$$F_L = k_1 \cdot \epsilon_L + k_2 \cdot \epsilon_R + K_L(\epsilon_L, \epsilon_R)$$

$$F_R = k_3 \cdot \epsilon_L + k_4 \cdot \epsilon_R + K_R(\epsilon_L, \epsilon_R)$$

Similarly, changes $H_L$, $H_R$ in the heights of lateral portions of the motor vehicle from the ground (relative vertical changes in the distances between the vehicle body and the centers of the road wheels) are calculated as follows:

$$H_L = k'_1 \cdot \epsilon_L + k'_2 \cdot \epsilon_R + K'_L(\epsilon_L, \epsilon_R)$$

$$H_R = k'_3 \cdot \epsilon_L + k'_4 \cdot \epsilon_R + K'_R(\epsilon_L, \epsilon_R)$$

In the above and following equations, $k_1, k_2, k_3, \ldots k_n, k'_1, k'_2, k'_3, \ldots k'_n$ ($n = 1, 2, 3, \ldots$) represent coefficients determined dependent on strain detecting positions and the like, and $K_L$, $K_R$, $K'_L$, $K'_R$, $K_M$, etc. represent corrective terms (i.e., functions of $\epsilon$, f, F, W, etc.). These coefficients (k) and the corrective terms are used in the following examples, but have different values in the examples.

EXAMPLE 2

Figure 6:
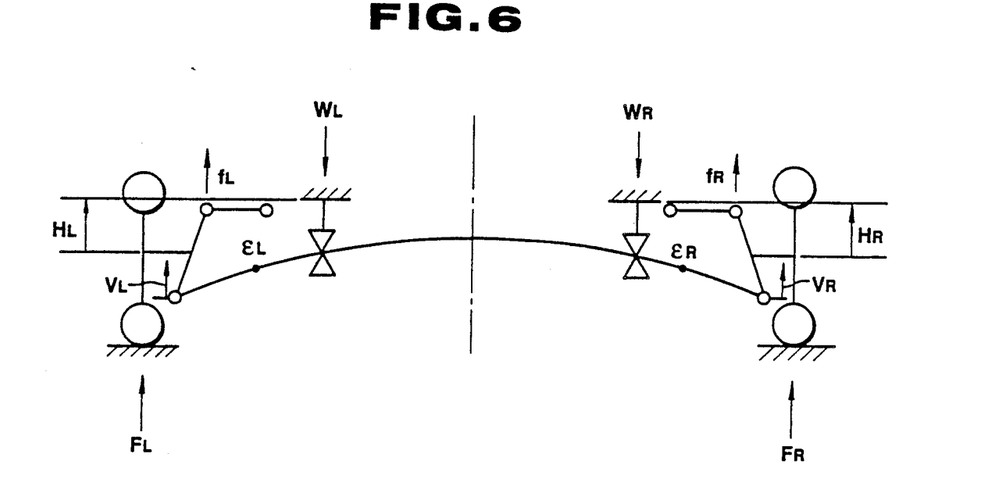
FIG. 6 is a schematic front elevational view of a suspension system, showing the manner in which a change in a suspension is determined when forces $f_L$, $f_R$, as well as the weight of a motor vehicle, are applied as external forces respectively to suspension components.

Loads $f_L$, $f_R$, as well as the weight of a motor vehicle are applied to suspension components shown in FIG. 6:

Changes $F_L$, $F_R$ in the loads applied to the road wheels are calculated by:

$$F_L = k_1 \cdot \epsilon_L + k_2 \cdot \epsilon_R + k_3 \cdot f_L + K_L(\epsilon_L, \epsilon_R, f_L)$$

$$F_R = k_4 \cdot \epsilon_L + k_5 \cdot \epsilon_R + k_6 \cdot f_R + K_R(\epsilon_L, \epsilon_R, f_R)$$

Changes $H_L$, $H_R$ in the heights of the lateral portions of the motor vehicle are calculated by:

$$\begin{aligned} H_L &= k'_1 \cdot \epsilon_L + k'_2 \cdot \epsilon_R + k'_3 \cdot f_L + k'_4 \cdot f_R + \\ & \quad K'_L(\epsilon_L, \epsilon_R, f_L, f_R) \\ H_R &= k'_5 \cdot \epsilon_L + k'_6 \cdot \epsilon_R + k'_7 \cdot f_L + k'_8 \cdot f_R + \\ & \quad K'_R(\epsilon_L, \epsilon_R, f_R, f_L) \end{aligned}$$

EXAMPLE 3

Figure 7:
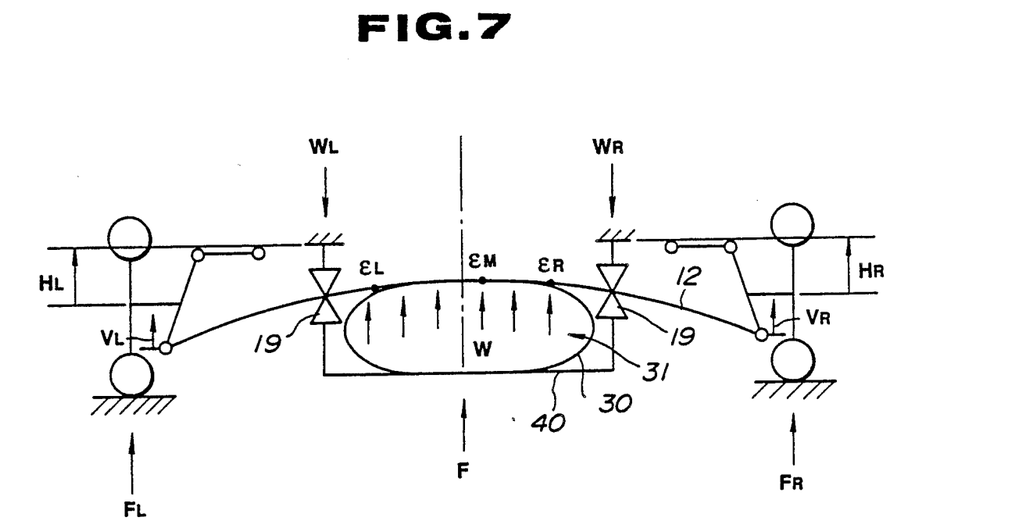
FIG. 7 is a schematic front elevational view of a suspension system, showing the manner in which a change in a suspension is determined when an unknown concentrated load F or distributed load W, as well as the weight of a motor vehicle, are applied as an external force to a leaf spring.
Figure 8:
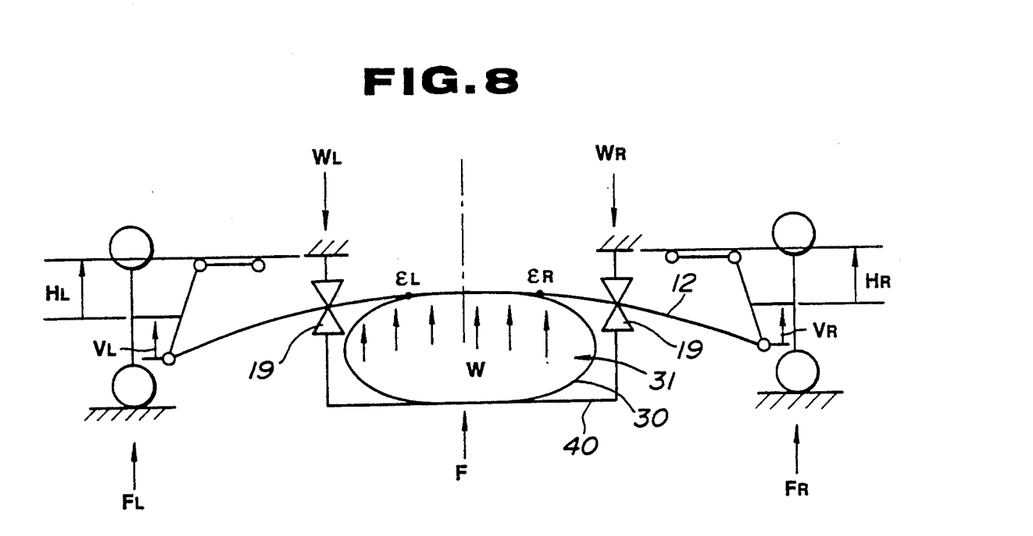
FIG. 8 is a schematic front elevational view of a suspension system, showing the manner in which a change in a suspension is determined when a known concentrated load F or distributed load W, as well as the weight of a motor vehicle, are applied as an external force to a leaf spring.

A concentrated load F or distributed load W produced by the load means, other than the motor vehicle weight ($W_L$, $W_R$), is applied to the leaf spring 12 shown in FIGS. 7 and 8:

(i) As shown in FIG. 7, where the concentrated load F or distributed load W is unknown, changes $F_L$, $F_R$ in the loads imposed on the road wheels are given as follows:

$$F_L = k_1 \cdot \epsilon_L + k_2 \cdot \epsilon_M + k_3 \cdot \epsilon_R + K_L(\epsilon_L, \epsilon_M, \epsilon_R)$$

$$F_R = k_4 \cdot \epsilon_L + k_5 \cdot \epsilon_M + k_6 \cdot \epsilon_R + K_R(\epsilon_L, \epsilon_M, \epsilon_R)$$

A load F is given by:

$$F = k_7 \cdot \epsilon_L + k_8 \cdot \epsilon_M + k_9 \cdot \epsilon_R + K_M(\epsilon_L, \epsilon_M, \epsilon_R)$$

Changes $H_L$, $H_R$ in the heights of the lateral portions of the motor vehicle are calculated by:

$$H_L = k'_1 \cdot \epsilon_L + k'_2 \cdot \epsilon_M + k'_3 \cdot \epsilon_R + K'_L(\epsilon_L, \epsilon_R, \epsilon_R)$$

$$H_R = k'_4 \cdot \epsilon_L + k'_5 \cdot \epsilon_M + k'_6 \cdot \epsilon_R + K'_R(\epsilon_L, \epsilon_M, \epsilon_M)$$

(ii) As shown in FIG. 8, where the concentrated load F or distributed load W is known, changes $F_L$, $F_R$ in the loads imposed on the road wheels are given as follows:

$$F_L = k_1 \cdot \epsilon_L + k_2 \cdot \epsilon_R + k_3 \cdot F + K_L(\epsilon_L, \epsilon_R, F)$$
$$F_R = k_4 \cdot \epsilon_L + k_5 \cdot \epsilon_R + k_6 \cdot F + K_R(\epsilon_L, \epsilon_R, F)$$

or $$F_L = k_7 \cdot \epsilon_L + k_8 \cdot \epsilon_R + k_9 \cdot W + K_L(\epsilon_L, \epsilon_R, W)$$
$$F_R = k_{10} \cdot \epsilon_L + k_{11} \cdot \epsilon_R + k_{12} \cdot W + KR(\epsilon_L, \epsilon_R, W)$$

Changes $H_L$, $H_R$ in the heights of the lateral portions of the motor vehicle are calculated by:

$$H_L = k'_1 \cdot \epsilon_L + k'_2 \cdot \epsilon_R + k'_3 \cdot F + K'_L(\epsilon_L, \epsilon_R, F)$$

$$H_R = k'_4 \cdot \epsilon_L + k'_5 \cdot \epsilon_R + k'_6 \cdot F + K'_R(\epsilon_L, \epsilon_R, F)$$

or $$H_L = k'_7 \cdot \epsilon_L + k'_8 \cdot \epsilon_R + k'_9 \cdot W + K'_L(\epsilon_L, \epsilon_R, W)$$

$$H_R = k'_{10} \cdot \epsilon_L + k'_{11} \cdot \epsilon_R + k'_{12} \cdot W + K'_R(\epsilon_L, \epsilon_R, W)$$

As schematically shown in FIGS. 7 and 8, the load means used herein comprises, for example, a bag 30 filled with a fluid 31 and disposed between the leaf spring 12 and a beam or a bag support member 40 supported by the holder members 19 and extending below the holder members 19. The bag 30 is prevented from being deformed downwardly by the beam or the bag support member 40. The amount of load applied to the leaf spring 12 can freely be adjusted by controlling the pressure of the fluid in the bag 30 with a pump or the like. The bag 30 is, for example, made of a flexible inexpansible material, and the filled fluid 31 comprises a gas as a compressible fluid. Conversely, the bag 30 may be made of an expansible material, and the fluid 31 may be an inexpansible fluid.

Figure 9:
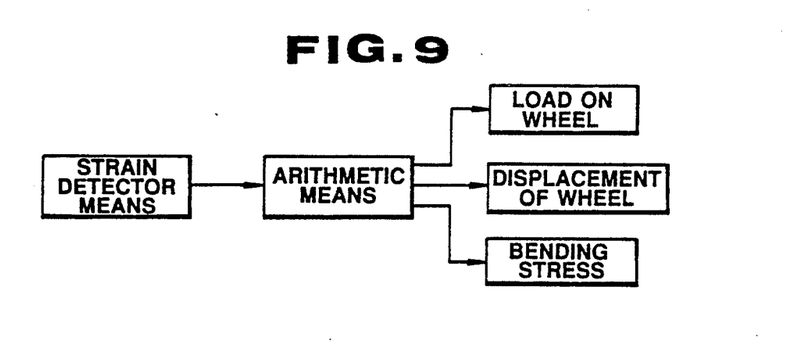
FIG. 9 is a block diagram of an arrangement for determining a change in the condition of a suspension according to the present invention.

The present invention is based on the fact that an elongate resilient member (i.e., the leaf spring in the above embodiments) extending transversely of a motor vehicle as part of suspension components interconnecting road wheels and a motor vehicle body is subject to a strain dependent on an external force applied to the elongate resilient member. As schematically shown in FIG. 9, the amount of strain detected by at least one strain detector means mounted on the resilient member or leaf spring is processed by an arithmetic means to determine changes in the condition of a suspension which are caused by an external force imposed on the suspension, i.e., loads applied to the road wheels in the vertical, longitudinal, and transverse directions of the motor vehicle, displacements of the road wheels with respect to the vehicle body, and bending stresses applied to the leaf spring.

If there are two unknowns ($F_L$, $F_R$ or $H_L$, $H_R$ and F, W, etc.), then at least two strain detectors are required, and if there are three unknowns, at least three strain detectors are required. If no load is applied to the leaf spring by a load means (FIGS. 5 and 6), then the two strain detectors may be attached anywhere to the leaf spring. If a load is applied to the leaf spring by a load means (FIGS. 7 and 8), and the applied load is unknown, then at least two out of a plurality of strain detectors mounted on the leaf spring must be located between the two holding points C in order to determine the unknown load. If the load applied by the load means is known, at least one strain detector should preferably be positioned between the holding points C.

While the arithmetic process has been described to determine changes in the condition of a suspension, one alternative approach to the present invention is to store experimentally determined changes in the condition of a suspension which are caused by strains of the leaf spring, changes in the condition of a leaf spring which are caused by changes in the attitude of a motor vehicle and loads on the motor vehicle as a data map, and a suspension condition may be determined from the data map based on a detected strain. The changes $H_L$, $H_R$ in the motor vehicle heights from the ground can be determined more accurately by taking into account amounts $V_L$, $V_R$ of flexing of the ends of the leaf spring.

Many variations can be made to the above-discussed preferred embodiments of the invention without departing from the spirit or scope of the invention. For example, the leaf spring serving as the elongate resilient member may double as upper arms or may be connected to upper arms. The suspension or suspensions to which the present invention can be applied are not limited to double-wishbone suspensions, but may be strut suspensions. The height of a motor vehicle from the ground can be adjusted by using a leaf spring with its longitudinal axis extending longitudinally of the motor vehicle.

The strain detectors used are simple in structure as they are only required to detect any strain of the resilient member, are good in space utility efficiency, and are lightweight, but nevertheless produce signals which are employed to determine loads on road wheels in vertical, longitudinal, and transverse directions of a motor vehicle, and displacements of the road wheels with respect to the motor vehicle body. By using detected signals from the strain detectors and results of arithmetic operations on the detected signals, suspension control can easily be performed.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A suspension system in a motor vehicle, comprising:
a suspension including at least a resilient member extending transversely of the motor vehicle and having one end operatively coupled to a knuckle, said resilient member supporting a vehicle body of the motor vehicle; and
detector means disposed on said resilient member for detecting at least one of a change in a load and a change in the height of the motor vehicle from the ground due to an external force applied to said suspension.

2. A suspension system according to claim 1, wherein said resilient member comprises at least a leaf spring, said detector means being attached to said leaf spring for detecting a strain of the leaf spring due to flexing thereof.

3. A suspension system according to claim 2, further comprising arithmetic means for calculating at least one of a vertical load applied to a road wheel coupled to said knuckle and a displacement of the road wheel with respect to the vehicle body based on a change in the strain detected by said detector means.

4. A suspension system according to claim 1, wherein said suspension comprises a double-wishbone suspension connected between said vehicle body and said resilient member and associated with a shock absorber, said resilient member serving as a spring for said shock absorber and also doubling as a lower arm of said double-wishbone suspension.

5. A suspension system according to claim 1, wherein said resilient member comprises an elongate resilient member extending between knuckles supporting two laterally spaced road wheels, respectively, of the motor vehicle, and having opposite ends coupled respectively to said knuckles, said suspension further including holder means coupled to the vehicle body and holding said elongate resilient member at two holding points which are swingable and slidable in the longitudinal direction of the elongate resilient member with respect to the vehicle body for bearing the load of the vehicle body.

6. A suspension system according to claim 5, wherein said elongate resilient member comprises a leaf spring, and said detector means comprising at least two detector means attached to said leaf spring for detecting a strain of the leaf spring due to flexing thereof.

7. A suspension system according to claim 6, further comprising arithmetic means for calculating vertical loads applied to said road wheels and displacements of the road wheels with respect to the vehicle body based on a change in the strain detected by said detector means.

8. A suspension system according to claim 5, wherein said elongate resilient member comprises a leaf spring having said two holding points, said system further including load means connected between said vehicle body and said leaf spring for applying a bending stress to said leaf spring between said two holding points to adjust the height of the motor vehicle from the ground, and arithmetic means for calculating vertical loads applied to said road wheels and displacements of the road wheels with respect to the vehicle body based on a change in the strain detected by said detector means.

9. A suspension system according to claim 8, wherein where the bending stress applied to said leaf spring by said load means is unknown, said detector means comprises at least three detector means including at least two detector means positioned between said two holding points, said arithmetic means including means for calculating the bending stress applied to said leaf spring by said load means as well as said vertical loads and said displacements based on the change in the strain detected by said detector means.

10. A suspension system according to claim 8, wherein where the bending stress applied to said leaf spring by said load means is known, said detector means comprises at least two detector means including at least one detector means positioned between said two holding points, said arithmetic means including means for calculating said vertical loads and said displacements based on the change in the strain detected by said detector means and the known bending stress.

11. A suspension system in a motor vehicle, comprising:
a suspension including a leaf spring extending transversely of the motor vehicle and having opposite ends operatively coupled to respective knuckles, and holder means for holding said leaf spring at two holding points which are swingable and slidable in the longitudinal direction of the leaf spring with respect to the vehicle body for supporting the vehicle body;
load means connected between said vehicle body and said leaf spring for applying a bending stress to said leaf spring between said two holding points to adjust the height of the motor vehicle from the ground;
strain detector means disposed on said leaf spring for detecting a strain of said leaf spring due to an external force applied thereto; and
arithmetic means for calculating vertical loads applied to road wheels coupled to said knuckles and displacements of the road wheels with respect to the vehicle body based on a change in the strain detected by said strain detector means.

12. A suspension system according to claim 11, wherein said load means comprises a restricting member extending between said two holding points and coupled to said holder means, and a bag disposed between said restricting member and said leaf spring and filled with a fluid for applying the bending stress to said leaf spring.

* * * * *

UNITED STATES PATENT AND TRADEMARK OFFICE
CERTIFICATE OF CORRECTION

PATENT NO. : 4,997,202

DATED : March 5, 1991

INVENTOR(S) : Kitagawa et al.

It is certified that error appears in the above-identified patent and that said Letters Patent is hereby corrected as shown below:

Column 2, line 29, after "knuckles" insert a period; change "related" to --Relatedly,--.

Column 5, line 59, change "(WL," to --$(W_L,$--.

Column 6, line 2, change "$F_R$are" to --$F_R$ are--;

line 8, change "$H_1$" to --$H_L$--;

line 16, change "$(\epsilon_1, \epsilon_R)$" to --$(\epsilon_L, \epsilon_R)$--;

line 31, change "$F_R$in" to --$F_R$ in--;

line 55, change "$F_R$in" to --$F_R$ in--.

Column 7, line 9, change "$F_R$in" to --$F_R$ in--;

line 66, change "$F_R$or" to --$F_R$ or--.

Column 8, line 6, delete "out".

Signed and Sealed this

Twenty-fourth Day of November, 1992

*Attest:*

DOUGLAS B. COMER

*Attesting Officer*   *Acting Commissioner of Patents and Trademarks*